(12) United States Patent
Lukis et al.

(10) Patent No.: US 7,089,082 B1
(45) Date of Patent: Aug. 8, 2006

(54) AUTOMATED MULTI-CUSTOMER MOLDING

(75) Inventors: Lawrence J. Lukis, Wayzata, MN (US); Christopher Walls-Manning, Ramsey, MN (US); Mark R. Kubicek, Lakeville, MN (US)

(73) Assignee: The Protomold Company, Inc., Maple Plain, MN (US)

( * ) Notice: Subject to any disclaimer, the term of this patent is extended or adjusted under 35 U.S.C. 154(b) by 0 days.

(21) Appl. No.: 11/114,893

(22) Filed: Apr. 25, 2005

(51) Int. Cl.
G06F 19/00 (2006.01)

(52) U.S. Cl. .................. 700/182; 700/197; 264/453

(58) Field of Classification Search ............. 700/180, 700/182, 197, 200, 201; 264/453; 345/420
See application file for complete search history.

(56) References Cited

U.S. PATENT DOCUMENTS

| | | | |
|---|---|---|---|
| 4,641,270 A | 2/1987 | Lalloz et al. | 364/476 |
| 5,189,626 A | 2/1993 | Colburn | 364/474.24 |
| 5,458,825 A | 10/1995 | Grolman et al. | 264/401 |
| 5,641,448 A | 6/1997 | Yeung et al. | 264/401 |
| 5,838,328 A | 11/1998 | Roller | 345/420 |
| 5,864,482 A * | 1/1999 | Hazama et al. | 700/95 |
| 6,096,088 A | 8/2000 | Yu et al. | 703/9 |
| 6,116,888 A | 9/2000 | Johnston et al. | 425/195 |
| 6,173,210 B1 | 1/2001 | Bjornson | 700/99 |
| 6,175,422 B1 | 1/2001 | Penn et al. | 358/1.1 |
| 6,219,055 B1 | 4/2001 | Bhargava | 345/355 |
| 6,675,055 B1 | 1/2004 | Fischer | 700/97 |
| 6,701,200 B1 | 3/2004 | Lukis et al. | 700/98 |
| 6,772,026 B1 * | 8/2004 | Bradbury et al. | 700/98 |
| 6,836,699 B1 | 12/2004 | Lukis et al. | 700/200 |
| 6,993,401 B1 * | 1/2006 | Davis | 700/100 |
| 2005/0122346 A1 * | 6/2005 | Horn | 345/629 |

OTHER PUBLICATIONS

Quickparts.com press release, "Quickparts.com Announces Next Day Service For SLA Rapid Prototypes", Sep. 23, 2002.
Quickparts.com press release, "Quickparts.com Announces The Release of Online Instantaneous Quotes for WaterClearTM and High Resolution Prototypes", Nov. 23, 2001.
Quickparts.com press release, "Quickparts.com Announces The Release of Online Instantaneous Quotes for Cast Urethane Production Prototypes", Jul. 16, 2001.

(Continued)

*Primary Examiner*—Jayprakash N. Gandhi
(74) *Attorney, Agent, or Firm*—Shewchuk IP Services; Jeffrey D. Shewchuk (57) ABSTRACT

A first customer provides a CAD file defining the surface profile for a part to be molded to the system, and a second customer does the same for a second part. The system determines whether the materials match and the run dates overlap, thereby qualifying the parts for use in a multi-customer mold block. The system assesses the part surface profile (which could have any of a virtually infinite number of shapes) of the parts submitted and lays out the parts from multiple customers on one or more multi-customer mold blocks. Savings are generated, such as by reducing redundancies in press clean-up, in set-up, in tooling, and in surface finishing. Due to these savings, the system provides a quotation of the part to at least one of the customers which differs from the quotation that would be provided if each part was run independent of parts of other customers.

20 Claims, 3 Drawing Sheets

OTHER PUBLICATIONS

Quickparts.com press release, "Quickparts.com Announces The Release of PolyQuote 1.0 Instant Quoting Technology for Build-To-Order Polyurethane Castings", May 14, 2001.

Quickparts.com press release, "Quickparts.com Announces The Release of QuickQuote™ Rev 2.0 Instant Online Quoting Engine", Mar. 5, 2001.

ASPire3D and Quickparts.com Announce Strategic Partnership, Jan. 2, 2001.

Quickparts.com press release, "Quickparts.com Announces The Release of "MyQuote" Instant Quoting Application", Oct. 16, 2000.

Quickparts.com press release, "Quickparts.com Completes Expansion To New Atlanta Facility", Jul. 5, 2000.

Quickparts.com press release, "Quickparts.com Expands On-line Instant Quoting to Include Investment Casting Patterns for the Low-Volume Custom Manufactured Metal Part Market", Apr. 11, 2000.

Quickparts.com press release, "Quickparts.com Surpasses 1000 On-line Quotes, $1 Million Quoted, In First 3 Months Of Operation", Apr. 11, 2000.

Quickparts.com press release, "QuickQuote™ Automates RP Quoting", Jan. 10, 2000.

Quickparts.com press release, "Quickparts.com Announces The Launch Of The First Web-Based E-Commerce System For Instant Quoting and Procurement of Rapid Prototyping Parts", Jan. 3, 2000.

Quickparts.com press release, "Quickparts.com Announces The Pre-Release Of The First Web-Based E-Commerce System For Instant Quoting and Procurement of Rapid Prototyping Parts", Dec. 15, 1999.

Quickparts.com press release, "Quickparts Launches QuickTool Express™, Instant Online Quotes for QuickTurn Injection Molded Parts", Jan. 10, 2005.

Quickparts.com press release, Quickparts Makes Inc. 500 List of Fastest Growing Private Companies, Nov. 9, 2004.

Quickparts.com press release, "Quickparts Named to Entrepreneur Magazine's Hot 100 Fastest Growing Entrepreneurial Companies", Jun. 2, 2004.

Quickparts.com press release, "Quickparts Offers New 'MultiQuote' Option for Rapid Prototypes & Cast Urethanes", May 10, 2004.

Quickparts.com press release, "Quickparts Offers New Real-Time Order Status and Shipment Tracking for Rapid Prototypes", Apr. 6, 2004.

Quickparts.com press release, "Quickparts.com Offers New ABS-like Stereolithography Material for Rapid Prototyping", Feb. 5, 2004.

Quickparts.com press release, "Quickparts.com Joins Solid Edge Voyager Program with MyQuote Instant Quoting Application", Oct. 16, 2003.

Quickparts.com press release, "QuickQuote Add-In for Autodesk Inventor Certified for Autodesk Inventor 6.0 and 7.0", Sep. 9, 2003.

Quickparts.com press release, "Quickparts.com Announces the Release of QuickQuote Add-in for Autodesk Inventor", Jun. 26, 2003.

Quickparts.com press release, "Resinate and Quickparts.com Announce Strategic Alliance.", Apr. 8, 2003.

* cited by examiner

AUTOMATED MULTI-CUSTOMER MOLDING

CROSS-REFERENCE TO RELATED APPLICATION(S)

None.

BACKGROUND OF THE INVENTION

The present invention relates to the field of mold making, and particularly to the manufacture of molds, such as for use with injection molding presses, from blocks of metal. More specifically, the present invention relates to software supported methods, systems and tools used in the design and fabrication of molds for custom plastic parts, and in presenting information to customers for the customer to make selections to help minimize the cost of the mold and running the customer's part.

Injection molding, among other types of molding techniques, is commonly utilized to produce plastic parts from molds. Companies and individuals engaged in fabricating molds are commonly referred to as "moldmakers." The moldmaking art has a long history of fairly gradual innovation and advancement. Molds are designed pursuant to a specification of the part geometry provided by a customer; in many cases, functional aspects of the plastic part also need to be taken into account. Historically, moldmaking involves at least one face-to-face meeting between the moldmaker and the customer, with complex communication between the moldmaker and the customer and complex decisions made by the moldmaker regarding the construct of the mold. More recently, this process has been automated to a significant degree, to assist in transmitting information between the moldmaker and/or the moldmaker's computer system and the customer, thereby realizing significant efficiencies and corresponding price reductions in the manufacture of molds and custom molded parts. Such automation is described in U.S. patent application numbers 11/074,388, 11/035,648, 10/970,130, 10/325,286(now issued as U.S. Pat. No. 6,836,699), and 10/056,755 (now issued as U.S. Pat. No. 6,701,200). While such software and automated methods have revolutionized the moldmaking process, additional cost reductions still can be obtained by creative and non-obvious modifications.

BRIEF SUMMARY OF THE INVENTION

The present invention is a method and system of automated manufacture of molded parts of two or more separate customers on a single multi-customer mold block, which may also be combined with software for quoting the part manufacture using the multi-customer mold block. To begin the process, a customer provides a CAD file defining the surface profile for a part to be molded to the system. The customer is permitted to indicate that a specific material and mold run date are acceptable, thereby qualifying the part for use in a multi-customer mold block. The system assesses the part surface profile (which could have any of a virtually infinite number of shapes) of the part submitted and lays out the parts from multiple customers on one or more multi-customer mold blocks. The system provides a quotation of the part to the customer which differs from the quotation that would be provided if the part was run independent of parts of other customers.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
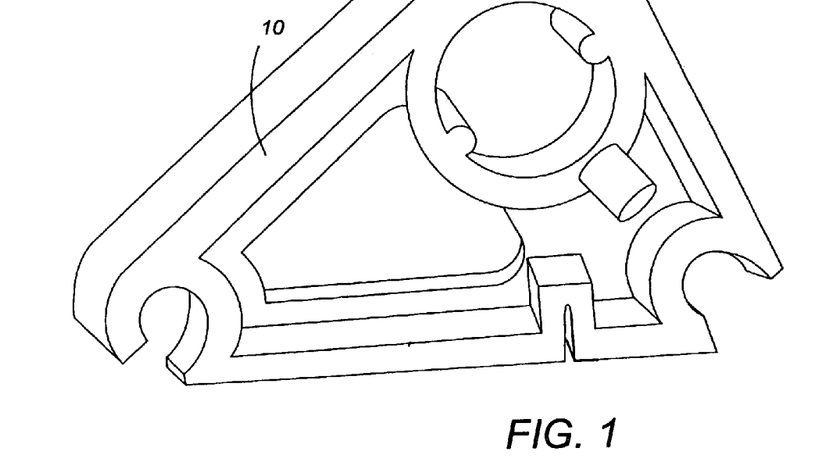
FIG. 1 is a perspective view of an exemplary "cam" part desired by a first customer.

The present invention will be described with reference to an exemplary part 10 shown in FIG. 1. FIG. 1 represents a "cam" part 10 designed by a first customer (who, for discussion, will be named "John One"). In part because the cam 10 is custom-designed (i.e., not a staple article of commerce) by or for this particular customer, the cam 10 includes numerous features, none of which have commonly accepted names.

The quoting of the mold and/or manufacture for the part 10 may generally proceed with automated systems and methods such as described in U.S. patent application Ser. Nos.11/074,388, 11/035,648, 10/970,130, 10/325,286 (now issued as U.S. Pat. No. 6,836,699), and 10/056,755 (now issued as U.S. Pat. No. 6,701,200), all incorporated by reference herein. As an example, the customer may have selected that one thousand cam parts 10, molded of ABS, Black (LUSTRAN 433-4000), finished to "T-0, Protomold discretion", to be run and delivered within 10–15 business days. In this example, the first customer's order is placed on March 1.

In prior art systems, the quoting and molding of the cam 10 is handled by itself, without regard for any molding that might be performed for other customers. Similarly, the quotation process of the cost of the mold and/or molded parts 10 can be (at least initially) handled by itself, without regard for any quotations that might be provided to other customers. However, certain efficiencies can be achieved by combining the needs of separate customers, and molding two or more customers' parts one after another, or, better yet, together on a multi-customer mold. The present invention is intended to capture these multi-customer molding efficiencies.

Figure 2:
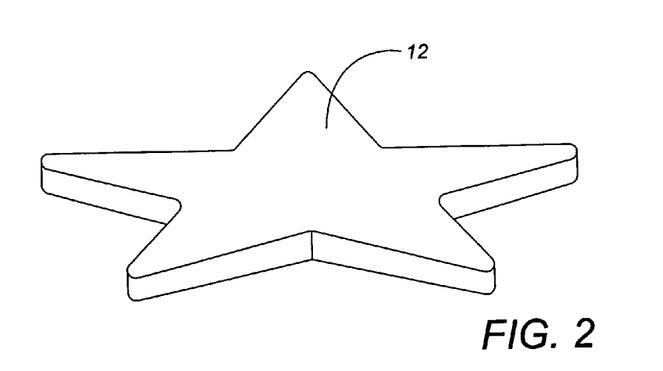
FIG. 2 is a perspective view of an exemplary "star" part desired by a second customer to be multi-customer molded with the cam part of FIG. 1.

A second exemplary part, of a different customer ("Jane Two"), is shown in FIG. 2. This exemplary part is a "star" 12. In the example we will discuss, the second customer orders two thousand star parts, molded of ABS, Black (LUSTRAN 433-4000), to be run and delivered within 10–15 business days. In this example, customer Jane Two's order is placed on March 7.

Figure 3:
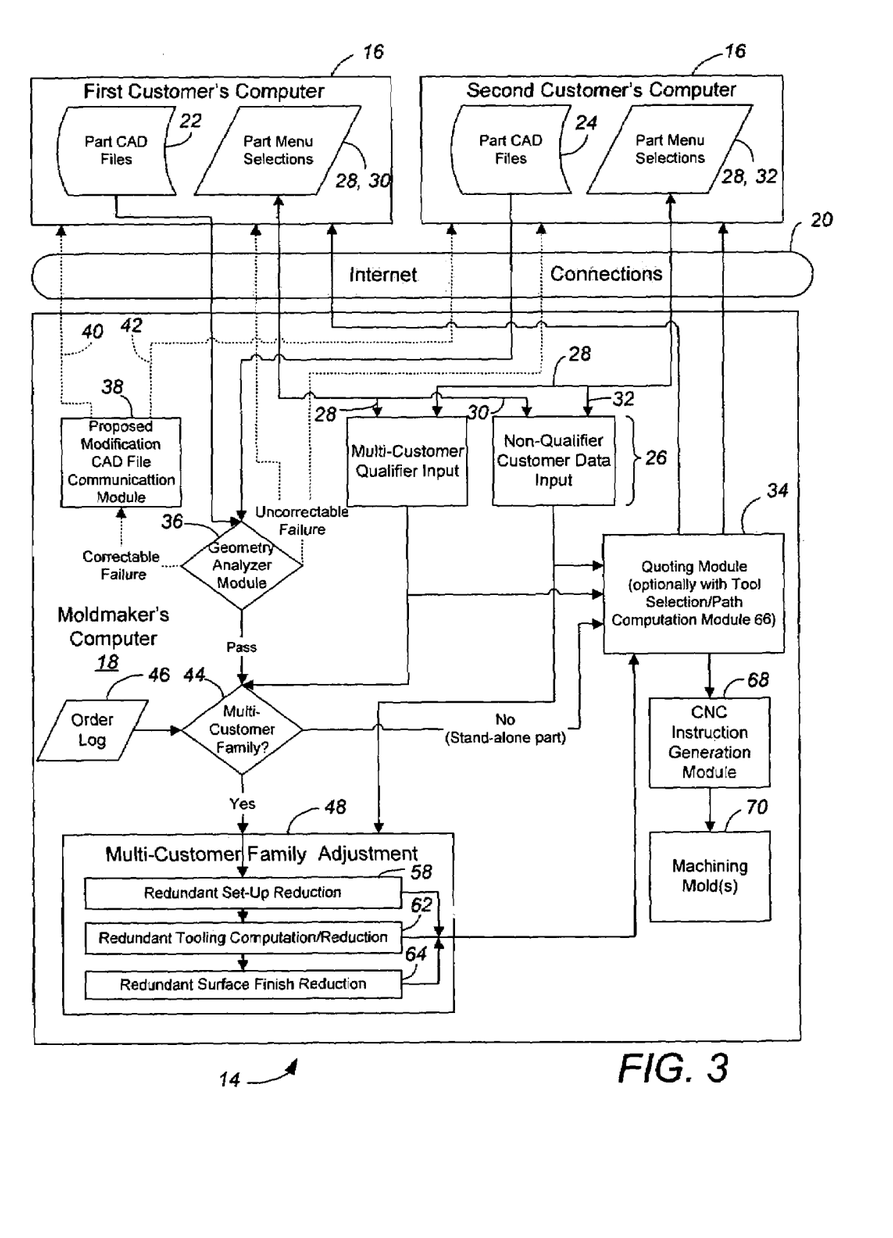
FIG. 3 is a flow chart of preferred software of the present invention.

FIG. 3 is a flow chart showing how the system 14 of the present invention is used to manufacture both customers' parts 10, 12. The preferred process takes place partially in the computers 16 of the first and second customer and partially in the moldmaker's computer 18, communicating with each other such as through the internet 20. Such communication could alternatively occur through a mailed computer disk or through a dial-up modem site. If desired, many of the software processes shown as occurring in the moldmaker's computer 18 could alternatively reside on the customers' computers 16, with the communication between the software and data files occurring largely within one or both customers' computers 16. In such a case, the moldmaker provides software to each customer which provides the some of the functions depicted in FIG. 3 as being in the moldmaker's computer 18. However, several functions depicted in FIG. 3 require consideration of the orders of other customers, which can only be performed on the moldmaker's computer 18.

Prior to seeking a quotation for part and/or mold manufacture, each customer prepares CAD part design files 22, 24 for each of the parts 10, 12. There are several standard exchange formats currently used in the 3D CAD industry. Presently the most widely used format is the Initial Graphics Exchange Specification (IGES) standard. The present invention accepts IGES, STL or various other formats, and is compatible with all the commercial CAD products currently in use. Further, the present invention can be readily adapted to operate with future CAD file formats, provided the CAD file defines a surface profile of a part desired to be molded.

A Customer Data Input Module 26 collects three different types of information from each customer: the customer's selections of non-CAD parameters 28 which are qualifiers for multi-customer molding, the customer's selections of non-CAD parameters 30, 32 which are customer specific irrespective of multi-customer molding, and the names of the CAD part design files and then the CAD part design files 22, 24 themselves as stored on the customer's computer 16. If desired, the CAD program could be modified to include fields separate from the part profile data to capture and associate the customer selections 28, 30, 32 with the CAD data 22, 24.

The first, and most important, non-CAD parameter 28 which affects qualification for multi-customer molding is choice of material. The same material must be used for all the parts within the multi-customer molding group. The preferred Customer Data Input Module 26 includes a drop down menu (not shown) of offered materials. The material or resin used for the parts 10, 12 is an integral consideration in the design process, affecting many material properties of the parts 10, 12 such as strength, flexibility, hardness, corrosion resistance, flammability, etc. Further, the cost of each plastic material or resin is subject to change due to market conditions. Accordingly, the preferred material menu provides numerous alternatives, such as the following seventy values: "Customer supplied", "ABS, Natural (LUSTRAN 433-1050)", "ABS, Black (CYCOLAC T-4500)", "ABS, Black (LUSTRAN 433-4000)", "ABS, White (LUSTRAN 248-2005)", "ABS, Black (POLYLAC PA-765)", "ABS Platable, Light Grey (LUSTRAN PG298)", "ABS Platable, Gray (CYCOLAC MG37EP)", "ABS/PC, Black (BAYBLEND FR 110-1510)", "ABS, White (LUSTRAN 248-2005)", "ABS/PC, Light Gray (BAYBLEND T85 2095)", "ABS/PC, Black (CYCOLOY C2950-701)", "ABS/PC, Natural (BAYBLEND T 45-1000)", "ABS/PC, Black (BAYBLEND T 85-1510)", "ABS/PC, Black (BAYBLEND T85 2D95)", "Acetal Copolymer, Black (CELCON M90)", "Acetal Homopolymer, Black (DELRIN 500 P BK602)", "Acetal Homopolymer, Natural (DELRIN 500P NC010)", "Acetal Homopolymer, 20% GF, Black (DELRIN 577-BK000)", "Acetal Homopolymer, Black (DELRIN 500 CL BK601)", "HDPE, Natural (HiD 9006)", "LDPE, Natural (DOW LDPE 722)", "Nylon 46, Natural (STANYL TW341)", "Nylon 6, Natural (ZYTEL 7331FNC010)", "Nylon 6, Black (ZYTEL 7331F dyed)", "Nylon 6, Black (RTP 200A FR)", "Nylon 66, Black (ZYTEL 101L BKB009)", "Nylon 66, 13% GF, Black (ZYTEL 70G13 HSIL)", "Nylon 66, 14% GF, Black (ZYTEL 8018 HS)", "Nylon 66, 43% GF, Black (ZYTEL 74G43W BK196)", "Nylon 66 33% GF, Natural (ZYTEL 70G33HSIL)", "Nylon 66, 33% GF, Black (ZYTEL 70G33 HSIL BK031)", "Nylon 66, Natural (ZYTEL 103 HSL)", "Nylon 66, Natural (RTP 202 FR)", "PBT 30% GF, Black (VALOX 420 SEO)", "PBT 15% GF, Black (CRASTIN SK 652 FR)", "PBT, Black (VALOX 357-1066)", "PC, Opaque/White (MAKROLON 2558-3336)", "PC, Black (LEXAN 940)", "PC, Clear (MAKROLON 2405-1112)", "PC, Clear (MAKROLON 2458-1112)", "PC, Black (MAKROLON 2405-1510)", "PC, 10% Glass, Black (MAKROLON 9415-1510)", "PC 20% GF, Natural (MAKROLON 8325-1000)", "PC 20% Glass, Black (MAKROLON 8325-1510)", "PC, clear (MAKROLON 6455-1045)", "PC, Infrared (LEXAN 121-S80362)", "PEI, Black (ULTEM 1000-7101)", "PEI, 20% GF, Black (ULTEM 2200-7301)", "PEI 30% GF, Black (ULTEM 2300-7301)", "PEI, 40% GF, Black (ULTEM 2400-7301)", "PET 30% Glass, Black (RYNITE 530-BK503)", "PET 45% Glass Mineral Flame Retardant, Black (RYNITE FR 945 BK507)", "PET 35% Glass Mica Low Warp, Black (RYNITE 935 BK505)", "PETG, Clear (EASTAR 6763)", "PMMA Clear (PLEXIGLAS V052-100)", "PP 20% Talc Filled, Natural (MAXXAM NR 218.G001-1000)", "PP, Black (MAXXAM FR 301)", "PP Copolymer, Natural (PROFAX 7531)", "PP Copolymer, Natural (PROFAX SR 857M)", "PP Homopolymer, Natural (PROFAX 6323)", "PP Homopolymer, Natural (PROFAX 6523)", "PS (GPPS), Clear (STYRON 666 Dwl)", "PS (HIPS), Black (RC 3502B)", "PS (HIPS), Natural (STYRON 498)", "PUR, Natural (ISOPLAST 202EZ)", "TPE, Natural (SANTOPRENE 211-45)", "TPE, Black (SANTOPRENE 101-73)", "TPU-Polyester, Black (TEXIN 285-1500)" and "TPU-Polyether, Natural (TEXIN 985-1000)". The term "plastic" material, as used in this application, is broadly defined and is not intended to limit the type of material which can be used in the injection molding process to polymers; in certain configurations materials (ceramics, glasses, sintered or low-melting-temperature metals, etc.) which are not polymers may be the plastic material used in the invention.

The second non-CAD parameter 28 which affects qualification for multi-customer molding is choice of delivery date. The benefits of multi-customer molding require that delivery dates of the first customer and second customer overlap, so the parts can be molded on the same day, at the same time or one after another. For instance, the customer may be provided with a menu permitting selection of a delivery date of "within 5 business days" or "10–15 business days". Alternatively, additional or more or less specific levels of delivery date selection may be provided. The preferred Quoting Module 34 includes a premium charged for rushed processing.

The customer's selections of non-CAD parameters 30, 32 which are customer specific include the quantity of parts desired. The quantity of parts is required to be selected as an initial parameter prior to quotation, because different customers will typically not select the same quantity of their parts. Further, the quantity of parts desired may affect the decision-making process as to whether it is economical to include different parts on a multi-customer mold.

Another non-CAD parameter 30, 32 which is customer specific is surface finishes. Similar to material and estimated delivery date, the Customer Data Input Module 26 may include a drop-down menu (not shown) of offered surface finishes. For example, the drop-down menu may include values of "T-0 (finish to Protomold discretion. Tool marks may be visible)", "SPI-C1 (600 Stone)", "SPI-B1 (400 Paper)", "T-1 (Medium bead blast finish—similar to a medium EDM finish)", "T-2 (Coarse bead blast finish—similar to a coarse EDM finish)" and "SPI-A2 (High Polish)". The customer may select different surface finishes for each side of the mold, or may even be permitted to select different surface finishes between different faces even on the same side of the part. To avoid naming confusion over the different faces, an alternative Customer Data Input Module provides a graphical representation of each side of the part with different faces marked with indicia, such as shaded in different colors. The alternative Customer Data Input Module then provides a drop-down menu for each colored shading on the graphical representation (i.e., "surface finish for blue face" menu, "surface finish for red face" menu, etc.) so the customer can select the surface finish applied to each colored face of the depicted cavity.

Once the customer has completed the data entry, the CAD file 22, 24 is submitted to the Geometry Analyzer Module 36 as shown in FIG. 3. The Geometry Analyzer Module 36 assesses the geometry of the customer's part 10 using a set of acceptability criteria, to thereby determine whether the mold for each part can be inexpensively manufactured. Various acceptability criteria can be used, depending upon the software and manufacturing capabilities used in automated manufacturing of the mold.

If the customer's CAD file 22, 24 fails one or more acceptability criteria, this failure is communicated to the customer. If desired, the failure to meet any acceptability criteria may be communicated through a telephone call. However, preferably the program automatically generates a computer message which is transmitted to the customer, such as an e-mail. The preferred acceptability failure message indicates the nature of the failure. In the most preferred embodiment, the program includes a Proposed Modification CAD File Communication Module 38. The Proposed Modification CAD Communication Module 38 provides a graphical rendering 40, 42 of the failed part which distinguishes between the portions of the part geometry which pass all acceptability criteria and the portions of the part geometry which fail at least one acceptability criteria. If the failure to meet one or more acceptability criteria cannot be correct, this information is also communicated to the customer.

If the part 10 passes the Geometry Analyzer Module 36, the customer is provided with an opportunity to finalize the quote. When the first customer requests finalization of the quote on production of the cam parts 10, the preferred system 14 reviews the data at a multi-customer review step 44 to determine whether it should be identified as a stand alone part. The multi-customer review step 44 references a log 46 of existing part orders at the moldmaker. For the purpose of our example, we will assume that, on March 1, no other orders existed using the material selected by the first customer, Black ABS (LUSTRAN 433-4000). Because no other like material parts are in the queue on the order log 46, John One's order for cams 10 starts a new family. The part data 22 is immediately submitted to the Quoting Module 34 as a stand-alone part. The Quoting Module 34 for a stand alone part may be done in accordance with prior art methods or other methods subsequently devised, optionally including a Tool Selection and Tool Path Computation Module. With the cam part 10 quoted, if the customer accepts the quote and moves forward with production, the cam part 10 is added to the order log 46 of parts awaiting production with the moldmaker.

The order log 46 of the queue of parts awaiting production might look as shown below in TABLE I:

TABLE I

| Order No. | Cust. # | Cust. Name | CAD File | Material | Order Date | Mold Date | Run Date |
|---|---|---|---|---|---|---|---|
| 1004 | 47 | John One | shaft.igs | PET 30% Glass, Black (RYNITE 530-BK503) | Feb. 23 | Mar. 5 | Mar. 7 |
| 1005 | 41 | Max | hub.stl | Nylon 6, Natural (ZYTEL 7331F NC010) | Feb. 25 | Dec. 12 | Mar. 9 |
| 1006 | 22 | Mary | truss.igs | PET 30% Glass, Black (RYNITE 530-BK503) | Feb. 28 | Mar. 6 | Mar. 8 |
| 1007 | 47 | John One | cam.igs | ABS, Black (LUSTRAN 433-4000) | Mar. 1 | Mar. 12 | Mar. 14 |

| Order No. | Surface Finish | Quantity | Quote | Family No. | RPC Red. | RSU Red. | RTC Red. | RSF Red. |
|---|---|---|---|---|---|---|---|---|
| 1004 | T-0 | 100 | $ 1,298.00 | 17 | $0.00 | $0.00 | $0.00 | $0.00 |
| 1005 | SPI-B1 | 50000 | $52,078.00 | 18 | $0.00 | $0.00 | $0.00 | $0.00 |
| 1006 | SPI-B1 | 2500 | $ 7,413.00 | 19 | $0.00 | $0.00 | $0.00 | $0.00 |
| 1007 | T-0 | 1000 | $ 4,395.00 | 20 | $0.00 | $0.00 | $0.00 | $0.00 |

While three other parts, including an earlier part of the same first customer John One, are in the queue, none of the earlier parts are to be molded of the same material. Accordingly, none of the parts are grouped together into the same multi-customer family. All of the molds are expected to be separately machined on their respective "Mold Date", including one "hub" part for which the mold was machined long ago but the customer is reordering in a larger quantity. No reduction in quote is given, either due to Redundant- Press Clean-up "RPC", Redundant Set-Up "RSU", Redundant Tooling Computation "RTC", or to Redundant Surface Finish "RSF".

To proceed with our example, the second customer ("Jane Two") places the order for the star part 12 on March 7. The preferred system 14, including the Geometry Analyzer Module 36, and the Proposed Modification CAD File Communication Module 38 as necessary, assesses the CAD file 24 for the star part 12. If the star part 12 passes, and the customer desires to finalize the quote, the Multi-Customer Family Review Step 44 then reviews the order log 46 of earlier parts waiting to be run and determines whether any are to be run out of the same material. In this case, the Multi-Customer Family Review Step 44 identifies that the cam part 10 of the first customer is in the queue waiting to be run on March 14. In one preferred embodiment, a slight reduction is immediately applied to the quote due to a redundant press clean-up ("RPC") reduction, because of the fact that, if the cam part 10 and the star part 12 are run (on separate molds) in the injection press one after another, the same plastic material is used for both runs and injection press clean-up times are reduced.

The Multi-Customer Family Step 44 further reviews the order log 46 to determine whether any like-material parts waiting to be run are also waiting to have their mold machined. In this case, the Multi-Customer Family Step 44 identifies that the mold for the cam part 10 of the first customer John One has not yet been fabricated. The Multi-Customer Family Step 44 then assesses both the cam part 10 and the star part 12 to determine whether cost savings will result from treating the parts 10, 12 together as a unit or family rather than individually molding the various parts 10, 12.

The first determination is whether multiple parts can be run in a single, multiple cavity mold. For instance, the multiple parts 10, 12 may need to fit within a maximum projected area of a mold block, as viewed through the straight-pull axis, of 50 sq. in. (400 sq. cm). Similarly, all the multiple parts 10, 12 in a single mold block may need to be smaller than a maximum shot volume, such as a maximum volume of 18 cu. in. (200 cc). The Multi-Customer Family Step 44 calculates whether multiple parts 10, 12 can be formed in a single mold block.

If a separate mold block is required for each part 10, 12, then there is no set-up reduction, and the Multi-Customer Family Step 44 returns this information to the Quoting Module 34. However, the real cost savings of the present invention involves the determination in the Multi-Customer Family Step 44 that a family of parts can be run without machining and running a separate mold block for each part. In the example, the cam 10 and star 12 could both fit within a single mold block, so the multi-customer family concept results in a significant cost savings.

Having determined that a multi-customer family is appropriate, a Multi-Customer Family Adjustment Module 48 assesses the part quantity requested for each of the parts 10, 12 to determine whether redundant set-up costs can be reduced. In this case, customer Jane Two is obtaining a quote for twice as many stars 12 as customer John One has ordered cams 10, which presents several different scenarios. First, two cavities may be machined into a single mold block and connected with standard runners. Two thousand parts are run for each of the cam 10 and star 12, with one thousand of the cams 10 discarded as extras. While this first approach is somewhat wasteful of plastic, it will likely still be more economical and efficient than fabricating and running two separate mold blocks. Alternatively, a gate shut-off valve 50 (shown in FIG. 4) may be added to the mold 52, to shut off the runners 54 to the cam cavity 56. A redundant set-up reduction step 58 determines whether there is enough room on the mold block for the shut-off valve 50, and determines whether the savings in plastic warrants the additional cost of adding the shut-off 50. If the difference in quantities between the different parts 10, 12 is low, the cost of the shut-off valve 50 may not be warranted. As a third alternative, the redundant set-up reduction step 58 determines whether multi-cavities of fewer than all the parts 10, 12 would result in significant savings. In the example, the quantities requested for the cam 10 and the star 12 could be achieved with a mold block 52 having one cam cavity 56 and two star cavities 60, then requiring only one thousand injection mold shots to be run on the press. The redundant set-up reduction step 58 thus determines whether there is enough space on the block for the multi-cavities (i.e., in this example, for three cavities), and assesses whether the cost difference between machining the multi-cavities 58 of the same part 12 versus adding the shut-off valve 50 is warranted by the savings from fewer injection press runs.

Figure 4:
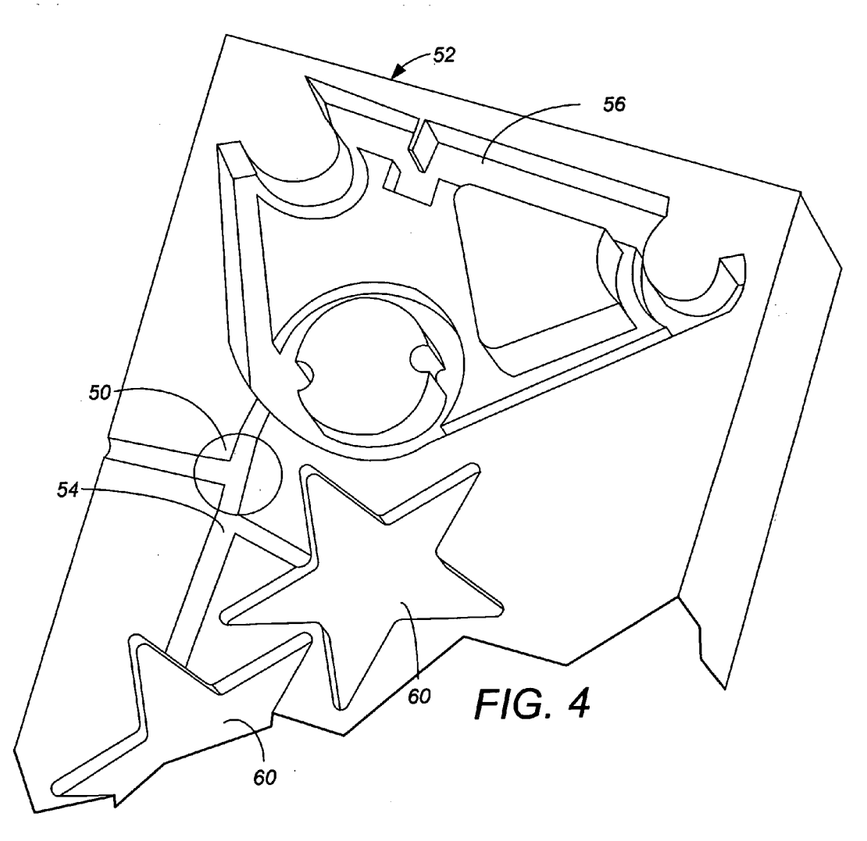
FIG. 4 is a perspective view of a portion of a mold in accordance with the present invention.

Part of the cost savings realized by the present invention is attributable to mold block costs. A single mold block 52 costs less than two. A larger part of the cost savings results from set-up costs. The mold block 52 need only be positioned once in the CNC machine that will machine both (or all three) cavities. The single mold block 52 need only be positioned once on the injection mold machine. No clean-up of the injection mold machine is needed while running both parts 10, 12.

Additional savings may result from the CNC machining of the single mold block 52. When multiple cavities are formed in a single mold block 52, the first cavity 56 does not need to be completed before machining is begun on the second cavity 60. In this example, much of the machining of the cavities 56, 60 for the cam 10 and star 12 will be performed by a ¼ inch end mill (not shown). The ¼ inch end mill can be used on all the cavities 56, 60 on the mold block 52 without requiring a tool change, and before any of the more detailed work is done on any of the cavities 56, 60. Thus, by using each tool on all cavities 56, 60 as needed before switching to a subsequent tool, CNC machining costs are reduced. The redundant tooling computation/reduction step 62 in the preferred Multi-Customer Family Adjustment Module 48 analyzes the tooling needed to determine whether such simultaneous machining results in lower costs to the customers.

Similar to the lower CNC machining costs, additional savings result if the different parts use the same surface finish. A single surface finishing step can be applied to all the cavities 56, 60 simultaneously, rather than applying separate surface finishing steps to each of two separate molds. In this example, both the first customer and the second customer permitted a surface finish of "T-0, finished to Protomold Discretion", reducing the cost incurred due to surface finishing steps. The redundant surface finish reduction step 64 in the preferred Multi-Customer Family Adjustment Module 48 analyzes the surface finishes selected by the customer to determine whether such simultaneous surface finishing results in lower costs which can be passed on to the customer.

If desired, the moldmaker may simply retain higher profits as a result of the savings from combining the job for the first customer John One with the job for the second customer Jane Two. Because neither John One nor Jane Two will see the mold, but rather will only receive molded parts, neither customer need be informed that their parts are being molded together with the parts of a different customer. The preferred embodiment, however, returns at least some of the cost savings to one or both customers.

The preferred Multi-Customer Family Adjustment Module 48 thus works in conjunction with the Quoting Module 34 to deliver the quote for the star part 12. The Quoting Module 34 may include assessment of various different costs of completing the mold and molded parts, such as (a) the machining actions which will be used to form the mold(s) (number of steps of CNC instructions, assessment of tools used and removal rates, tool change times, parting line and shut-off surface complexity, etc.); (b) the size of the parts; (c) ribbing and tightly radiused corners; (d) draft angles; (e) EDM requirements; (f) side action requirements; (g) the difficulty in applying the selected surface finishes; (h) volume and plastic material costs; and (i) flow analysis and quality of part assessment. Reductions to the quotation for the star part 12 are taken due to the press clean-up savings, due to the set-up savings, due to the tooling savings, and due to the surface finish savings.

The Quoting Module 34 communicates the quotation to customer Jane Two, preferably through the internet 20 such as through the moldmaker's website (if real-time quotation is attained) or through a responsive e-mail to customer Jane Two's computer 16. Jane Two may then accept the quotation through the same medium. It is noted that the quotation provided by the Quoting Module 34 need not represent a legal offer to enter into a contract for manufacture of the mold(s) or parts 12. In the moldmaking field as well as in other industries, quotations are often given which are subject to final review by the company making the quotation before entering into a binding contract with an accepting customer.

In the preferred system 14, the Quoting Module 34 operates in conjunction with the Geometry Analyzer Module 36 to provide graphical feedback to the customer. Preferably, this feedback occurs in real time to allow each customer to redesign physical features of the parts 10, 12 (i.e., change the underlying CAD file 22, 24 for the part 10, 12) while obtaining real-time quotation information of how the redesign affects the quotation.

The Multi-Customer Quoting Adjustment 48 of the present invention is also an important tool which can be used by design engineers separately from other facets of the preferred system 14, such as to compare different material alternatives. Since it is fast and easy, instant online quoting is a powerful tool for budgeting and comparing design alternatives during the development process. For instance, design engineers may weigh the costs of forming a part with the same material as another, anonymous customer (and thereby obtaining multi-customer family mold savings) versus forming the part with a different material. Design engineers may use online quoting several times in the design of a part, and online quoting will become a very important part of their design process. If desired, the Multi-Customer Quote Adjustment 48 and Quoting Module 34 may be enhanced to provide a "budget-driven" or reverse quotation for the parts.

The price reduction obtained by the Multi-Customer Family Adjustment 48 need not be provided entirely to the second customer Jane Two, with the first customer John One receiving none of the benefit. Instead, at the time that Jane Two accepts her quotation for the star parts 12 (or indeed, at any time thereafter prior to billing John One), the quotation to John One may be reduced due to the actions of Jane Two. For instance, the preferred quoting module 34 may send an e-mail to John One after he has accepted the first quotation, informing him that the lead time in his order has enabled the moldmaker to further reduce his costs in conjunction with the orders of subsequent customers, and that the moldmaker is passing on these savings to John One by reducing the price of his parts. TABLE II below demonstrates the example savings to both John One and Jane Two once Jane Two has accepted the quotation for the star parts 12.

TABLE II

| Order No. | Cust. # | Cust. Name | CAD File | Material | Order Date | Mold Date | Run Date |
|---|---|---|---|---|---|---|---|
| 1005 | 41 | Max | hub.stl | Nylon 6, Natural (ZYTEL 7331F NC010) | Feb. 25 | Dec. 12 | Mar. 9 |
| 1006 | 22 | Mary | truss.igs | PET 30% Glass, Black (RYNITE 530-BK503) | Feb. 28 | Mar. 6 | Mar. 8 |
| 1007 | 47 | John One | cam.igs | ABS, Black (LUSTRAN 433-4000) | Mar. 1 | Mar. 12 | Mar. 14 |
| 1008 | 53 | Fred | rod.igs | PC, clear (MAKROLON 6455-1045) | Mar. 5 | Mar. 8 | Mar. 10 |
| 1009 | 66 | Sue Three | disc.igs | ABS, White (LUSTRAN 248-2005) | Mar. 6 | Mar. 17 | Mar. 19 |
| 1010 | 12 | Jane Two | star.stl | ABS, Black (LUSTRAN 433-4000) | Mar. 7 | Mar. 12 | Mar. 14 |

| Order No. | Surface Finish | Quantity | Quote | Family No. | RPC Red. | RSU Red. | RTC Red. | RSF Red. |
|---|---|---|---|---|---|---|---|---|
| 1005 | SPI-B1 | 50000 | $52,078.00 | 18 | $0.00 | $0.00 | $0.00 | $0.00 |
| 1006 | SPI-B1 | 2500 | $ 7,413.00 | 19 | $0.00 | $0.00 | $0.00 | $0.00 |
| 1007 | T-0 | 1000 | $ 4,098.00 | 20 | $25.00 | $150.00 | 1% | $78.00 |
| 1008 | SPI-C1 | 1400 | $ 6,924.00 | 21 | $0.00 | $0.00 | $0.00 | $0.00 |
| 1009 | T-1 | 22000 | $ 8,265.00 | 22 | $0.00 | $0.00 | $0.00 | $0.00 |
| 1010 | T-0 | 2000 | $ 2,295.00 | 20 | $25.00 | $150.00 | 1% | $78.00 |

As shown, the multi-customer family adjustment 12 has been provided back to both John One and Jane Two in the form of a reduced quote, with John One saving $297 and Jane Two saving $278. The $278 savings of Jane Two was included in her initial March 7 quote, while the $297 savings to John One was communicated to him on March 7, six days after he had accepted the $4,395 quote. With the preferred system 14, the same result would have been achieved had Jane One ordered her stars 12 before John One ordered his cams 10, provided the mold fabrication and run dates still overlapped, and either customer could be designated the "first" customer in accordance with the invention.

The next part of the preferred embodiment involves the Tool Selection And Tool Path Computation Module 66. The Tool Selection And Tool Path Computation Module 66 may be activated upon receipt of an accepted quotation, but more preferably operates in conjunction with the Multi-Customer Family Adjustment Module 48 and the Quoting Module 34 as discussed earlier, and only immediately prior to machining the mold 52 for the parts 10, 12. The task of The Tool Selection And Tool Path Computation Module 66 is to determine what tools to use and what tool paths should be used with those tools to efficiently manufacture the mold 52 for all the parts 10, 12 specified by the CAD files 22, 24 of the customers which will be placed on the same mold block 52.

Once the parting line and shutoff surfaces have been defined, the mold layout(s) including any side actions, any multi-customer family and any multi-cavity parts has been specified, the tools have been selected, and the tool paths for the cavities 56, 60 have been computed, the preferred method includes a CNC Instruction Generation Module 68 which generates the detailed instructions that will be used by the CNC milling equipment to cut the mold(s) 52 from a raw block(s) of aluminum. The final step 70 in the preferred process is machining the mold(s). The shutoff surfaces are machined into the mold block(s) 52 with the selected tools and computed machining actions and via the computer generated series of CNC machining instructions. The cavities 56, 60 are likewise machined into the first and second halves of the mold(s) 52. Locations for ejector pins are machined into the first and second halves of the mold(s) 52 via the computer generated series of CNC machining instructions, as are runners 54 and gates. The number of pieces ordered by each customer are run in an injection mold press. The cam parts 10 are shipped back to customer John One, and the star parts 12 are shipped back to customer Jane Two. Each customer is billed in accordance with his or her quotation.

While many different materials are offered by the preferred embodiment, and many different lead times can be offered, another preferred embodiment involves purposefully influencing the selections of customers to take advantage of the multi-customer molding savings. As one example, the moldmaker may advertise selected dates and selected materials as savings days, such as having the first Monday of each month be designated as "ABS Monday". The lowest quotations for parts made of ABS are provided if the customer accepts delivery following ABS Monday. By advertising ABS Monday, customers are more likely to adjust their schedules and materials to take advantage of the multi-customer family adjustment savings. If sufficient customer demand exists, all parts that are ordered for ABS Monday—including the first part quoted in the family—may be calculated with the various multi-customer reductions, recognizing the high likelihood that multi-customer savings will be achieved for all ABS parts ordered for ABS Monday. If numerous customers order ABS Monday parts, the layout of all the various parts on the various mold blocks may be delayed until immediately prior to fabricating the ABS Monday molds, thereby optimizing the layout of all the ABS Monday parts on the mold blocks.

Other steps could also be taken to purposefully influence the selections of customers to take advantage of the multi-customer molding savings, in addition to or in substitution for the "ABS Monday" concept. For instance, while all the materials offered are different, they can be divided into different classes of similar materials. With the example data given above, a third customer ("Sue Three") wants parts run with a different material ("ABS, White (LUSTRAN 248-2005)") than ordered by John One. White ABS is very similar to Black ABS, only in a different color. It's very possible that Sue Three would switch her part to Black ABS if she was aware that the slight change in material resulted in significant cost savings. One preferred embodiment identifies subsequent orders of materials that fall into the same class as earlier orders (such as different colors of like resins), and queries the customer whether they would switch materials to obtain a better, discounted price.

The present invention allows mass production techniques to be used in the moldmaking process, even though every mold is custom designed, custom machined and different. Moreover, those mass production techniques can be used over multiple different customers' molds, without losing confidentiality over the design of each customer's part and order data.

Although the present invention has been described with reference to preferred embodiments, workers skilled in the art will recognize that changes may be made in form and detail without departing from the spirit and scope of the invention. As one example, while the present invention has been described with relation to various patentable features being performed in separately named modules, computer programmers will recognize many equivalent options exist for naming of the modules and organization of the programming features.

The invention claimed is:

1. A method of manufacturing two or more molded parts of separate customers, the method comprising:
   receiving customer part data from a first customer comprising a CAD file for a first part to be molded, the CAD file defining a first part surface profile, the customer part data from the first customer further comprising a selection of material and a selection of a first delivery time;
   receiving customer part data from a second customer different from the first customer, the customer part data from the second customer comprising a CAD file for a second part to be molded, the CAD file defining a second part surface profile; the customer part data from the second customer further comprising a selection of material and a selection of a second delivery time;
   automatically determining that the first part and the second part can be molded in a family mold, the automatic determining requiring both the first part and the second part to be molded of the same material, requiring that the first delivery time and the second delivery time overlap, and requiring that a cavity for the first part and a cavity for the second part fit within a single mold block size;
   machining, within a single mold block, the cavity for the first part based upon the CAD file defining the first part surface profile and the cavity for the second part based upon the CAD file defining the second part surface profile; and running the single mold block in an injection mold press to manufacture the first part and the second part.

2. The method of claim 1, further comprising:
automatically determining that the first part is to be run in a different quantity from the second part; and
adding a shut-off valve to the single mold block.

3. The method of claim 1, further comprising:
automatically determining that the first part is to be run in a higher quantity than the second part; and
machining a second cavity for the first part in the single mold block.

4. The method of claim 1, further comprising:
machining the cavity for the first part with a first tool;
prior to completion of machining the cavity for the first part, machining the cavity for the second part with the first tool without a tool change.

5. The method of claim 1, further comprising:
providing the first customer with a first quotation for the manufacture of the first parts; and
providing the second customer with a second quotation for the manufacture of the second parts.

6. The method of claim 5, wherein the first quotation is provided to the first customer before the customer part data is received from the second customer.

7. The method of claim 6, wherein the amount of the first quotation is reduced after receipt of the customer part data from the second customer based upon a relationship between quantity ordered by the first customer and quantity ordered by the second customer.

8. The method of claim 6, wherein the amount of the second quotation varies based upon a relationship between quantity ordered by the first customer and quantity ordered by the second customer.

9. The method of claim 6, further comprising:
determining that the first part is to be run in a different quantity from the second part; and
adding at least a portion of a cost of a gate shut-off valve to the second quotation.

10. The method of claim 6, further comprising:
communicating the first quotation to the first customer via computer; and
communication the second quotation to the second customer via computer.

11. The method of claim 6, wherein the second quotation assesses whether identical tooling can be used to machine a cavity for the first part and a cavity for the second part, thereby reducing tool change costs.

12. The method of claim 6, wherein the second quotation assesses whether identical surface finishes can be used for a cavity the first part and a cavity for the second part, thereby reducing surface finishing costs.

13. A method of manufacturing molds for a plurality of separate customers, the method comprising:
receiving customer part data from each of a plurality of separate customers, each customer part data comprising a CAD file for at least one part to be molded, each CAD file defining a part surface profile, each customer part data further comprising a selection of material and a selection of a delivery time;
automatically determining which parts from the plurality of separate customers qualify for multi-customer family molding, the automatic determining requiring the multi-customer family molded parts to be molded of the same material, and requiring that the delivery times for the multi-customer family molded parts overlap;
laying out the multi-customer family molded parts in a fewer number of mold blocks than the number of multi-customer family molded parts in accordance with an automated lay-out algorithm;
machining cavities for the multi-customer family molded parts based upon the CAD files and based upon the lay out into one or more multi-customer mold blocks; and
running the multi-customer mold block(s) in an injection mold press to manufacture parts; and
separately delivering each customer's parts to that customer.

14. The method of claim 13, wherein the automated lay-out algorithm minimizes a total number of mold blocks based upon areal lay out of the multi-customer family molded parts.

15. The method of claim 13, wherein the automated lay-out algorithm is based upon matching quantities of parts to be molded.

16. The method of claim 13, wherein the automated lay-out algorithm is based upon matching plastic flow rates and/or volumes of parts to be molded.

17. The method of claim 13, further comprising:
determining that a first part is to be run in a different quantity from a second part on the same multi-customer mold block; and
adding a gate shut-off valve to the multi-customer mold block.

18. The method of claim 13, wherein a first tool is used on a first cavity for the first part and on a second cavity for the second part prior to using a second tool on the first cavity for the first part.

19. A computer readable medium storing a program for custom quotation for manufacture of injection molded parts from two or more customers, the computer program comprising:
an input dedicated for receiving customers' CAD files, each CAD file defining a shape of a part to be molded;
computer code providing a suggested material from a plurality of possible materials and a suggested delivery date from a plurality of possible deliver dates;
computer code for analyzing the customer's CAD files to determine at least one cost-affecting parameter of injection mold manufacture; and
an output providing a dollar value quotation for injection molded part manufacture which includes costs associated with machining a cavity into the injection mold, the cavity corresponding in shape to the part to be injection molded, the output based in part on the cost-affecting parameter of injection mold manufacture as determined by the computer code analysis of the customer's CAD file, the output also based in part upon whether the customer accepts the suggested material and suggested delivery date to thereby mold the part with at least one other customer's part of the same material and same delivery date.

20. The computer readable medium of claim 19, wherein computer code assesses savings associated with molding the part and the at least one other customer's part together on a multi-customer mold.

* * * * *

UNITED STATES PATENT AND TRADEMARK OFFICE
CERTIFICATE OF CORRECTION

| | | |
|---|---|---|
| PATENT NO. | : 7,089,082 B1 | Page 1 of 1 |
| APPLICATION NO. | : 11/114893 | |
| DATED | : August 8, 2006 | |
| INVENTOR(S) | : Lawrence J. Lukis et al. | |

It is certified that error appears in the above-identified patent and that said Letters Patent is hereby corrected as shown below:

At Col. 6, lines 42-43, in TABLE 1, in the column for Material and the row for Order No. 1004, delete "PET 30% Glass, Black (RYNITE 530-BK503)" and insert therefor --PEI, 40% GF, Black (ULTEM 2400-7301)--.

Signed and Sealed this

Fourteenth Day of November, 2006

JON W. DUDAS
*Director of the United States Patent and Trademark Office*